(12) United States Patent
Bayer et al.

(10) Patent No.: US 7,999,521 B2
(45) Date of Patent: Aug. 16, 2011

(54) DC-DC CONVERTER USABLE FOR DUAL VOLTAGE SUPPLY

(75) Inventors: Erich Bayer, Thonhausen (DE); Juergen Neuhaeusler, Bad Aibling (DE); Stefan Reithmaier, Vilsheim (DE)

(73) Assignee: Texas Instruments Deutschland GmbH, Freising (DE)

( * ) Notice: Subject to any disclaimer, the term of this patent is extended or adjusted under 35 U.S.C. 154(b) by 502 days.

(21) Appl. No.: 12/235,309

(22) Filed: Sep. 22, 2008

(65) Prior Publication Data

US 2009/0167264 A1      Jul. 2, 2009

Related U.S. Application Data

(60) Provisional application No. 61/016,972, filed on Dec. 27, 2007.

(30) Foreign Application Priority Data

Sep. 24, 2007 (DE) .......................... 10 2007 045 464

(51) Int. Cl.
*G05F 1/577* (2006.01)
*G05F 1/40* (2006.01)
(52) U.S. Cl. ......................... 323/267; 323/225; 323/285
(58) Field of Classification Search .................. 323/225, 323/267, 271, 282, 284, 285, 290
See application file for complete search history.

(56) References Cited

U.S. PATENT DOCUMENTS 4,740,878 A * 4/1988 Carter et al. .................... 363/63

(Continued)

FOREIGN PATENT DOCUMENTS

DE        33 16251        11/1984

(Continued)

OTHER PUBLICATIONS

Deutsche Patent und Markemant, Office Action issued regarding German Patent Application DE 10 2007 045 464.5 dated Sep. 24, 2007.

*Primary Examiner* — Jessica Han
(74) *Attorney, Agent, or Firm* — John J. Patti; Wade J. Brady, III; Frederick J. Telecky, Jr.

(57) ABSTRACT

A converter has a single inductor with a first terminal connectable to a first terminal of the supply input through a first power transistor and a second terminal connectable to a second terminal of the supply input through a second power transistor. A first rectifier element connects the first terminal of the inductor with a first output terminal, and a second rectifier element connects the second terminal of the inductor with a second output terminal. A resistive voltage divider is connected between the first and second output terminals. A control circuit uses an input from the voltage divider as a reference input voltage and provides an output current to the second terminal of the supply input in response to any voltage difference between the reference input voltage and the second terminal of the supply input. This provides a virtual common reference potential at the second terminal of the supply input, which is thus a common ground (GND) terminal. In the ON phase of both power transistors, the inductor is charged with current from the supply input. In the OFF phase (both power transistors are OFF), the energy stored in the inductor is supplied to both of the positive and the negative supply output through the rectifier elements, the output current in fact flowing almost exclusively between the positive and negative supply outputs. Thus, in the OFF phase, the inductor is entirely isolated from the supply input and the supply outputs are in no way affected by any transients or fluctuations in the supply input voltage.

14 Claims, 6 Drawing Sheets

U.S. PATENT DOCUMENTS

| | | | | |
|---|---|---|---|---|
| 5,828,208 A * | 10/1998 | Oku | ............................. | 323/282 |
| 6,522,110 B1 | 2/2003 | Ivanov | | |
| 6,919,713 B2 * | 7/2005 | Hoshino et al. | ............... | 323/267 |
| 7,119,521 B2 | 10/2006 | Ishii et al. | | |
| 7,723,965 B2 * | 5/2010 | Lesso et al. | .................... | 323/225 |
| 7,759,914 B2 * | 7/2010 | Odell et al. | ................... | 323/267 |

FOREIGN PATENT DOCUMENTS

| | | |
|---|---|---|
| DE | 19916005 A1 | 12/2000 |
| EP | 1324477 A2 | 2/2003 |
| EP | 1 324 477 | 7/2003 |

* cited by examiner

DC-DC CONVERTER USABLE FOR DUAL VOLTAGE SUPPLY

This patent application claims priority from German Patent Application No. 10 2007 045 464.5, filed 24 Sep. 2007, and from U.S. Provisional Patent Application No. 61/016,972, filed 27 Dec. 2007, the entireties of which are incorporated herein by reference.

FIELD OF THE INVENTION

The invention relates to a DC-DC converter which, from a single supply input, produces first and second output voltages of opposite polarities with respect to a common reference potential.

BACKGROUND

A particular application that needs positive and negative supply voltages with respect to a common ground potential is an active matrix OLED (organic light-emitting diode) display. Typical supply requirements for such an application are ELVdd=4.0 to 6.0V and ELVss=−5.0 to −8.0V at a current consumption of 15 to 50 mA, depending on brightness and size of the display. For portable solutions, the available supply input voltage usually comes from a lithium-ion (Li-Ion) single cell at a voltage of 2.5 to 5.0V. The target efficiency of the system should be on the order of 80%.

The brightness of the individually-controlled OLED pixels depends heavily on the values of the supply voltages applied to the display panel. Any fluctuation in the supply voltages is recognized as a pattern over the OLED display panel. The tolerated maximum fluctuation in the supply voltage for transients of 0.5V at the converter input is 2 to 5 mV. Standard dual inductor switched mode converters cannot produce such low fluctuation values (i.e., high power rejection ratio). To achieve the required low level of fluctuations, additional linear voltage regulators are needed. The additional linear voltage regulators, however, reduce the overall power efficiency of the system.

SUMMARY

The invention provides a single inductor DC-DC converter with an inherently high power supply rejection ratio (PSRR) without the need for additional linear voltage regulators.

In one embodiment, the converter has a single inductor with a first terminal connectable to a first terminal of the supply input through a first power transistor, and a second terminal connectable to a second terminal of the supply input through a second power transistor. A first rectifier element connects the first terminal of the inductor with a first output terminal, and a second rectifier element connects the second terminal of the inductor with a second output terminal. A resistive voltage divider is connected between the first and second output terminals. A control circuit uses an input from the voltage divider as a reference input voltage and provides an output current to the second terminal of the supply input in response to a voltage difference between the reference input voltage and the second terminal of the supply input. This provides a virtual common reference potential at the second terminal of the supply input, which serves as a common ground (GND) terminal. In an ON phase of both power transistors, the inductor is charged with current from the supply input. In an OFF phase with both power transistors off, the energy stored in the inductor is supplied to both the positive and negative supply outputs through the rectifier elements, the output current in flowing almost exclusively between the positive and negative supply outputs. Thus, in the OFF phase, the inductor is entirely isolated from the supply input, and the supply outputs are in no way affected by any transients or fluctuations in the supply input voltage. Since the output current to the OLED display panel flows predominantly from the positive supply output to the negative supply output, there is almost no DC current to the ground node of the connected OLED display panel, which is at the virtual common reference potential of the converter. Any AC glitches at the ground node are easily handled by output buffer capacitors. As long as any DC ground current remains low, e.g., up to 2 mA, it is easily provided by a control circuit with a buffer-connected operational amplifier between the tap node of the resistive divider and the virtual ground node. For higher ground compensation currents the control circuit adjusts the ON-OFF timing of the power transistors so as to provide the required symmetry between both outputs.

In another embodiment, the converter has a single inductor with a first terminal connectable to a first terminal of the supply input through a first power transistor, and a second terminal connectable to a second terminal of the supply input through a second power transistor. A first rectifier element connects the first terminal of the inductor with a first output terminal, and a second rectifier element connects the second terminal of the inductor with a second output terminal. A resistive voltage divider is connected between the first and second output terminals. A control circuit uses an input from the voltage divider as a reference input voltage and adjusts the ON-OFF timing of the power transistors so as to maintain symmetry between both converter outputs.

An additional requirement of OLED displays is that, in shutdown mode, both supply voltages need to be totally isolated from the input supply voltage. With a converter as described herein, this is easily achieved by keeping the first power transistor in the OFF condition.

For high efficiency, a preferred embodiment uses synchronous rectifiers (integrated power MOS transistors) instead of simple diodes.

BRIEF DESCRIPTION OF THE DRAWINGS

Further features and advantages of the invention will become apparent from the following description of example embodiments, with reference to the accompanying drawings, wherein.

DETAILED DESCRIPTION OF EXAMPLE EMBODIMENTS

Figure 1:
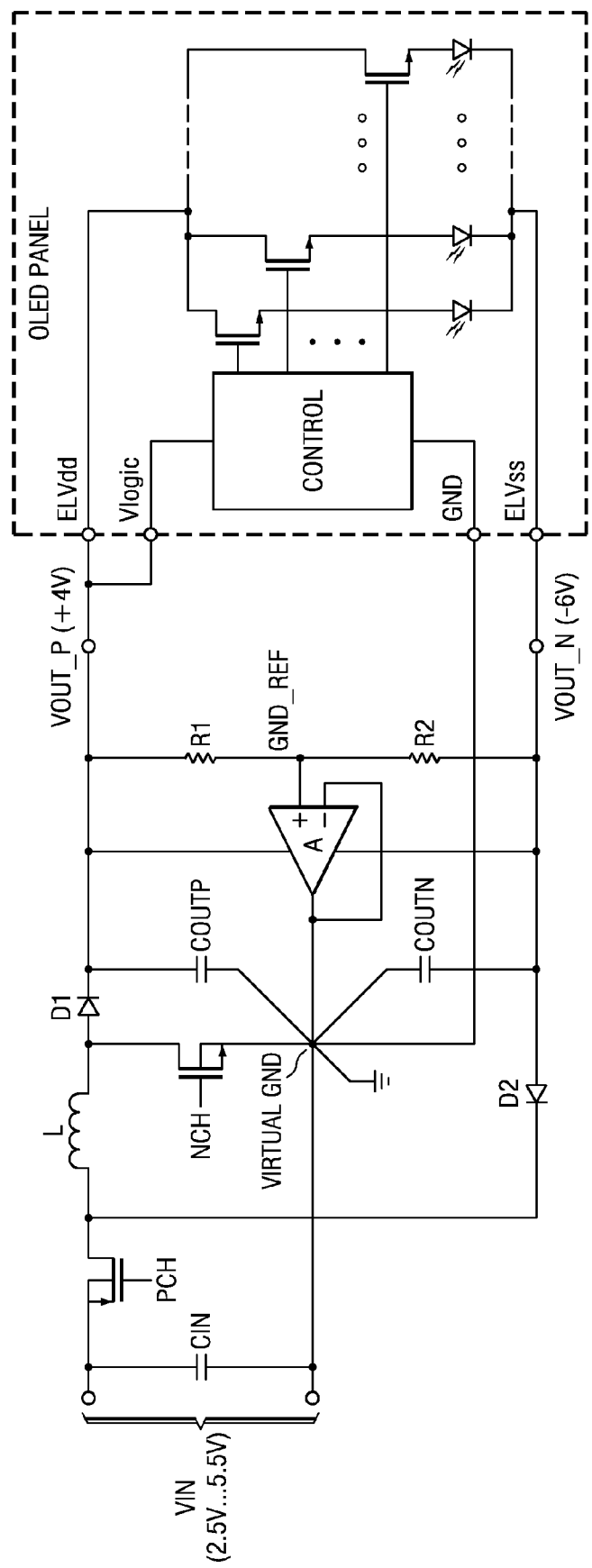
FIG. 1 is a schematic circuit diagram of an example converter usable as a dual voltage supply for an OLED display panel.

FIG. 1 illustrates an example implementation as applied to an OLED display panel which needs a positive supply voltage ELVdd and a negative supply voltage ELVss, both referenced to a common ground GND. A control block CONTROL of the OLED panel is supplied with a logic voltage Vlogic taken from ELVdd and the common ground reference voltage GND. Multiple outputs of the control block CONTROL drive corresponding display elements each comprising a MOSFET transistor connected in series with an LED between supply terminals ELVdd and ELVss.

For this particular application, the DC-DC converter in FIG. 1 has an input voltage VIN of, e.g., 2.5 to 5.5V and provides a positive output voltage VOUT_P of, e.g., +4V and a negative output voltage VOUT_N of, e.g., −6V. A capacitor CIN is connected across the input terminals.

The converter is shown implemented as a CMOS integrated circuit. A first power transistor PCH, in this case a p-channel MOSFET, is connected in series with an inductor L and a diode D1 between the positive input terminal of VIN and the positive output terminal VOUT_P. The interconnection node between transistor PCH and inductor L is connected trough a diode D2 to the negative output terminal VOUT_N. A second power transistor NCH, in this case an n-channel MOSFET, is connected between the negative input terminal of VIN and the interconnection node of the inductor L with diode D1. In this particular design of the converter, the negative input terminal of VIN is used as a virtual reference (ground) terminal GND. Each output VOUT_P and VOUT_N is buffered to ground GND by a corresponding capacitor COUTP and COUTN.

The reference level of virtual ground terminal GND is determined by a resistive voltage divider comprising series-connected resistors R1 and R2 coupled between output terminals VOUT_P and VOUT_N. The tap node GND_REF between R1 and R2 is connected to the non-inverting input of a linear operational amplifier A connected as a buffer and having its output connected to virtual ground VIRTUAL GND.

Figure 2:
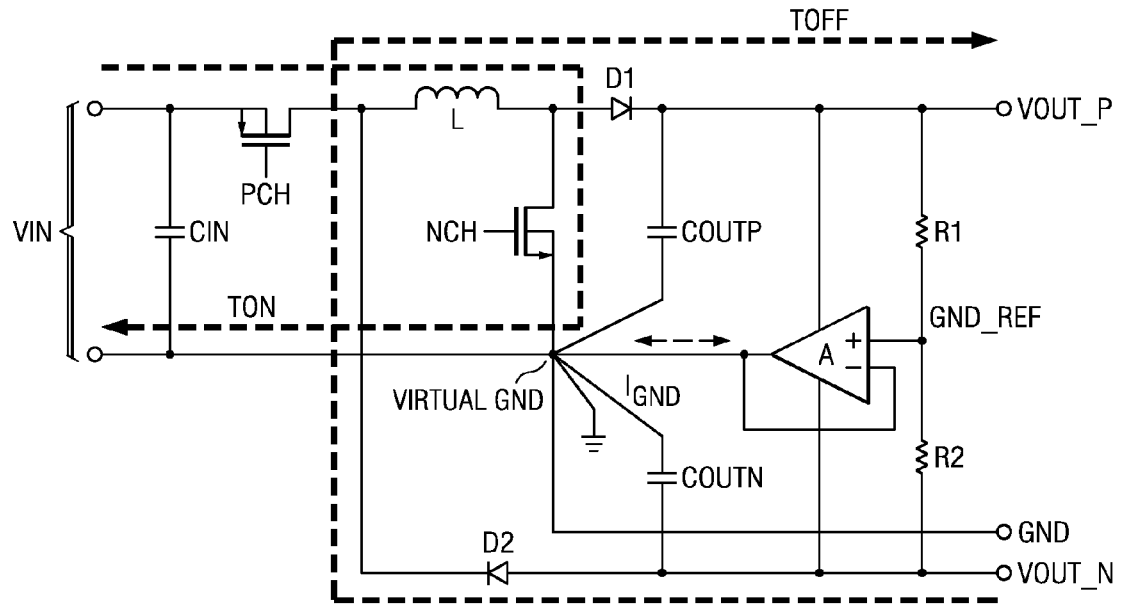
FIG. 2 is a schematic circuit diagram illustrating the operation of the converter of FIG. 1.

With reference to FIG. 2, transistors PCH and NCH are periodically controlled to be simultaneously ON or OFF. In the ON condition, the inductor L is charged with energy by current flowing as indicated in FIG. 2 at "TON." In the OFF condition, the energy stored in inductor L is discharged by current flowing between the output terminals VOUT_P and VOUT_N, as indicated in FIG. 2 at "TOFF." Any DC current due to leakage, diode reverse recovery losses and other unsymmetrical glitch currents into the ground node GND is compensated with a current $I_{GND}$ from the output of amplifier A. In fact, the amplifier A is part of a control circuit that uses the reference voltage GND_REF as an input to provide an output current $I_{GND}$ to the virtual ground terminal VIRTUAL GND to compensate for any unbalance.

Figure 3:
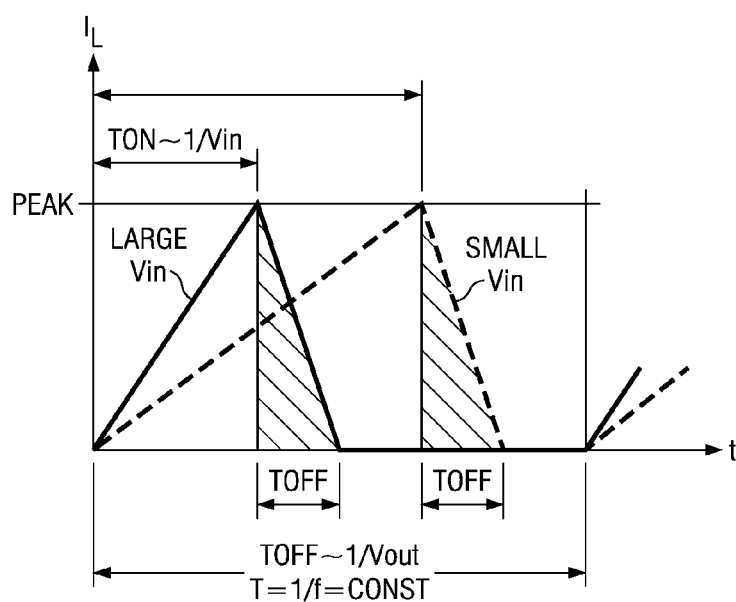
FIG. 3 is a graph illustrating inductor current vs. time for the converter of FIG. 1.

With reference to FIG. 3, it is seen that the inductor current $I_L$ is periodic with a charge ramp that rises up to a fixed peak value and a discharge ramp that is allowed to drop to zero, i.e., the converter operates in discontinuous mode at a fixed period T=1/f. The duration TON where both transistors PCH and NCH are ON, i.e., the duration of the charge ramp, is inversely proportional to the input voltage Vin. Thus, the slope in the inductor current's charge phase is also dependent on the input voltage. In contrast, the duration TOFF of the discharge phase is not dependent on the input voltage, it depends on the output voltage and is inversely proportional to the output voltage.

The embodiment in FIGS. 1 and 2 intrinsically has an infinitely high PSRR. No additional linear voltage regulators are required in the application of FIG. 1. In this application, the OLED panel is easily isolated from both supply outputs by holding transistor PCH in the OFF condition during shutdown. During the OFF phase, the inductor is completely isolated from the supply input. However, this concept is used only with relatively small ground compensation currents (e.g., above 2 mA).

Figure 4A:
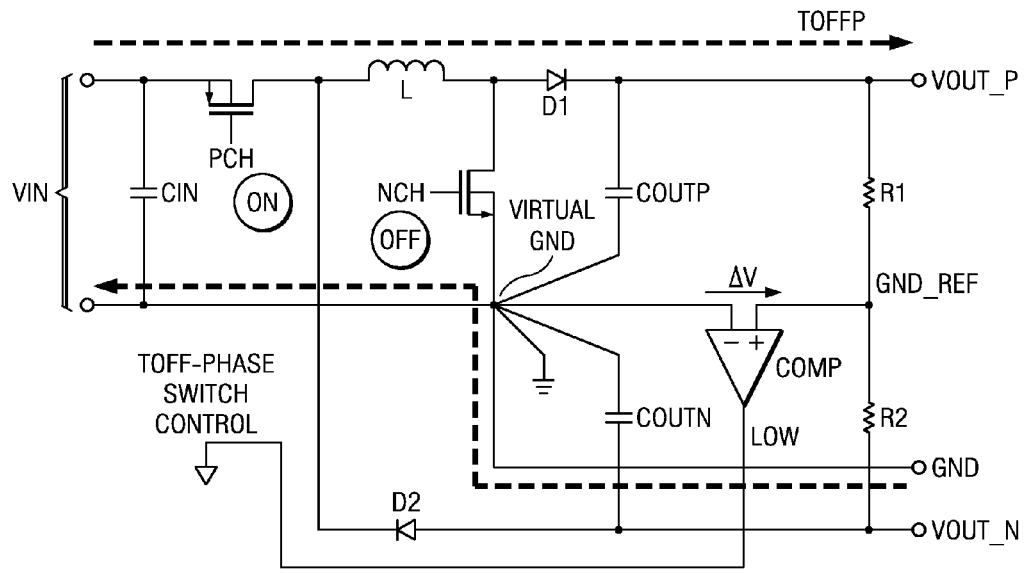
FIGS. 4a and 4b are schematic circuit diagrams of an alternative embodiment of the converter, illustrating two operating conditions.
Figure 4B:
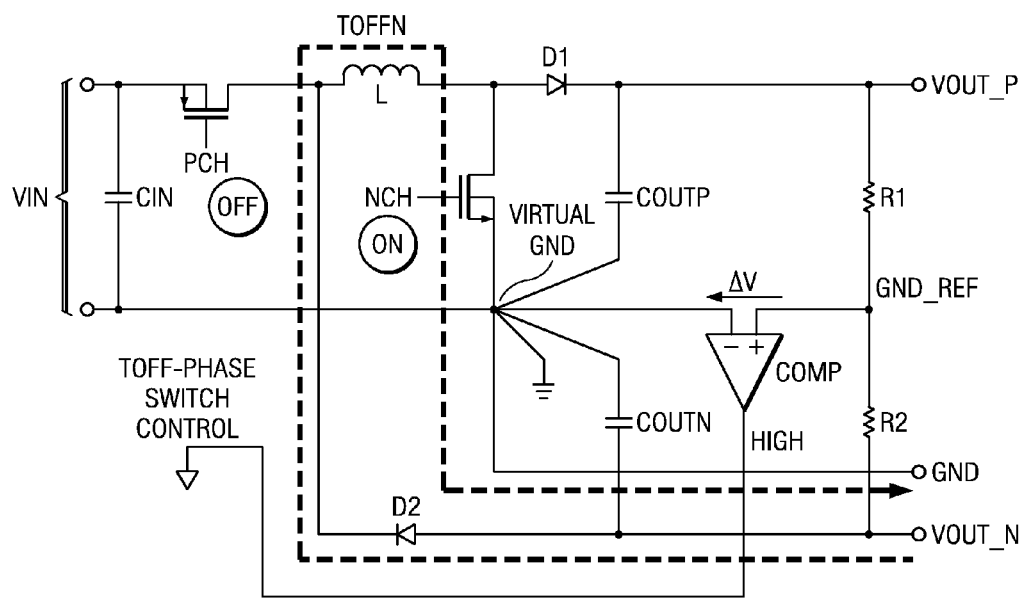

For larger dissymmetry between both outputs of the converter, a different concept is used as an alternative, or in addition, as explained with reference to FIGS. 4a and 4b. The embodiment in FIGS. 4a and 4b uses the same converter concept, but the control circuit that eliminates any unbalance with respect to the reference level is different. It acts on the ON-OFF conditions of transistors PCH and NCH.

In this embodiment, a comparator COMP measures any deviation ΔV between the virtual reference node VIRTUAL GND and the reference voltage GND_REF. When the voltage at the reference node VIRTUAL GND exceeds the reference voltage GND_REF, the output of the comparator COMP is LOW, as shown in FIG. 4a, and a single OFF cycle with transistor PCH ON and transistor NCH OFF is initiated to deliver energy only to the positive output VOUT_P. When the reference voltage GND_REF exceeds the voltage at node VIRTUAL GND, the output of the comparator COMP is HIGH, as shown in FIG. 4b, and a special OFF cycle with transistor PCH OFF and transistor NCH ON is initiated to deliver energy only to the negative output VOUT_N.

Figure 5:
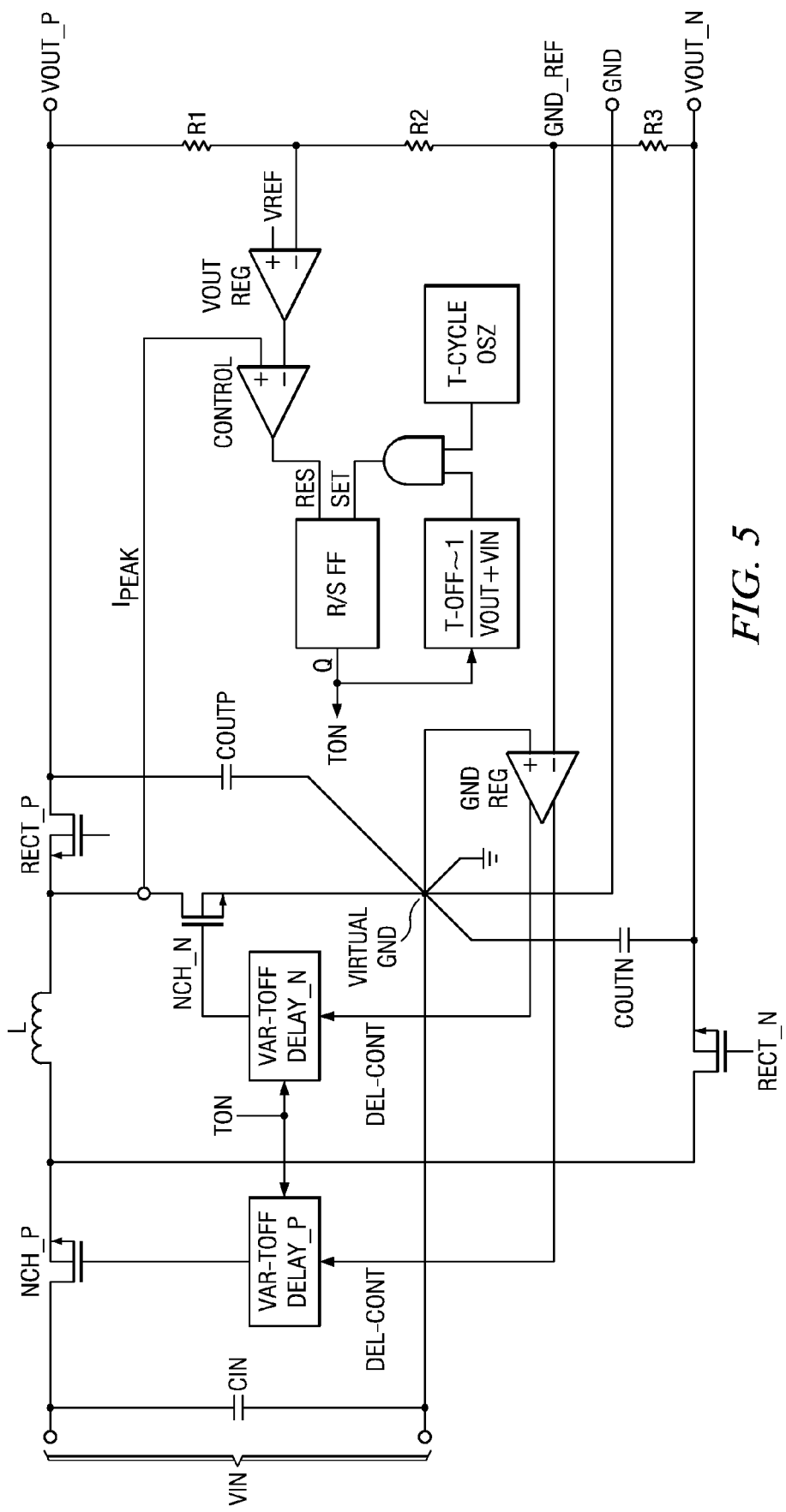
FIG. 5 is a more detailed circuit diagram of an embodiment of the converter.

In a preferred embodiment, the diodes D1 and D2 are replaced by synchronous rectifiers, i.e., switched power transistors RECT_P and RECT_N, as shown in FIG. 5, to improve the overall efficiency. In the embodiment of FIG. 4, a full TOFF period is dedicated to only one output channel to establish symmetry. A smoother and more precise ground regulation concept is used in the embodiment of FIG. 5.

For the arrangement of FIG. 5, a resistive voltage divider comprising resistors R1, R2 and R3 is connected across outputs VOUT_P and VOUT_N, and a ground reference voltage GND_REF at the node between resistors R2 and R3 is applied to the inverting input of a linear operational amplifier GND REG. The operational amplifier GND REG compares the voltage at the virtual ground node VIRTUAL GND with the reference voltage GND_REF. Differential outputs of the amplifier are applied to control inputs DEL_CONT of variable delay circuits VAR_TOFF_DELAY_P and VAR_T-OFF_DELAY_N, the first of which drives the gate of transistor NCH_P and the second of which drives the gate of transistor NCH_N. The variable delay circuits VAR_T-OFF_DELAY_P and VAR_TOFF_DELAY_N further receive a control input TON from inductor current regulation circuitry with an operational amplifier CONTROL that receives a current measurement signal taken from the node between inductor L and transistor RECT_P on its non-inverting input and an output from an operational amplifier VOUT REG on its inverting input. The inputs to the operational amplifier VOUT REG are a reference voltage VREF and the measured voltage at the node between resistors R1 and R2.

The voltage regulation circuitry in the FIG. 5 embodiment uses a peak current, constant off-time regulation scheme. The operating conditions of the converter are summarized in the table below.

| MODE: | NCH_N | NCH_P | RECT_N | RECT_P |
|---|---|---|---|---|
| SHUTDOWN | OFF | OFF | OFF | OFF |
| ON-STATE (ton) | ON | ON | OFF | OFF |
| NORMAL OPERTATION OFF-STATE (toff) | OFF | OFF | ON | ON |
| GND COMP VOUT_P OFF-STATE (toffp) | OFF | ON | ON | OFF |
| GND COMP VOUT_N OFF-STATE (toffn) | ON | OFF | OFF | ON |

Figure 6:
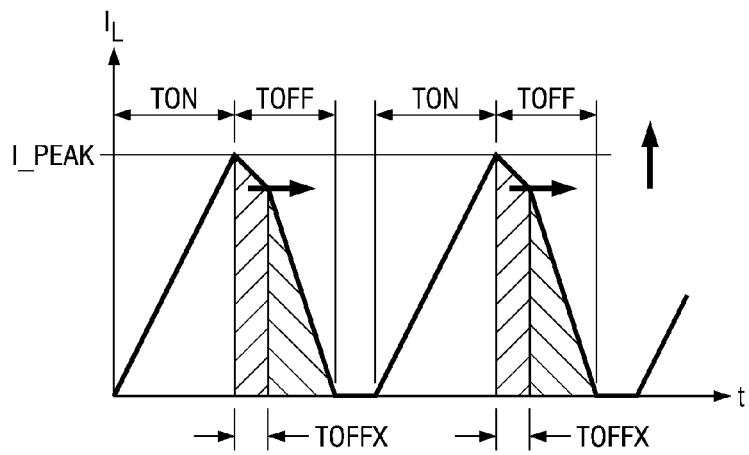
FIG. 6 is a graph illustrating inductor current vs. time for the converter of FIG. 5.

As seen in FIG. 6, the TOFF phase includes a short TOFFX time where only one transistor NCH_P or NCH-N is momentarily turned off and energy is supplied to only one output (VOUT_P or VOUT_N). After time TOFFX, both transistors are turned off, and energy is supplied to both outputs.

Figure 8:
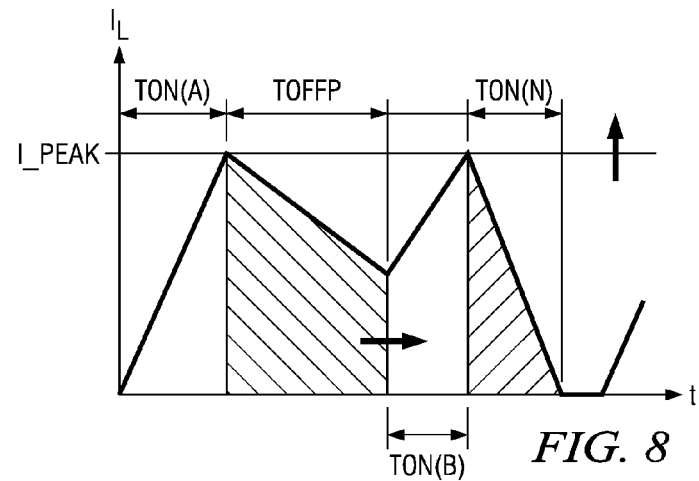
FIG. 8 is a graph illustrating inductor current vs. time for the embodiment of FIG. 7.
Figure 7:
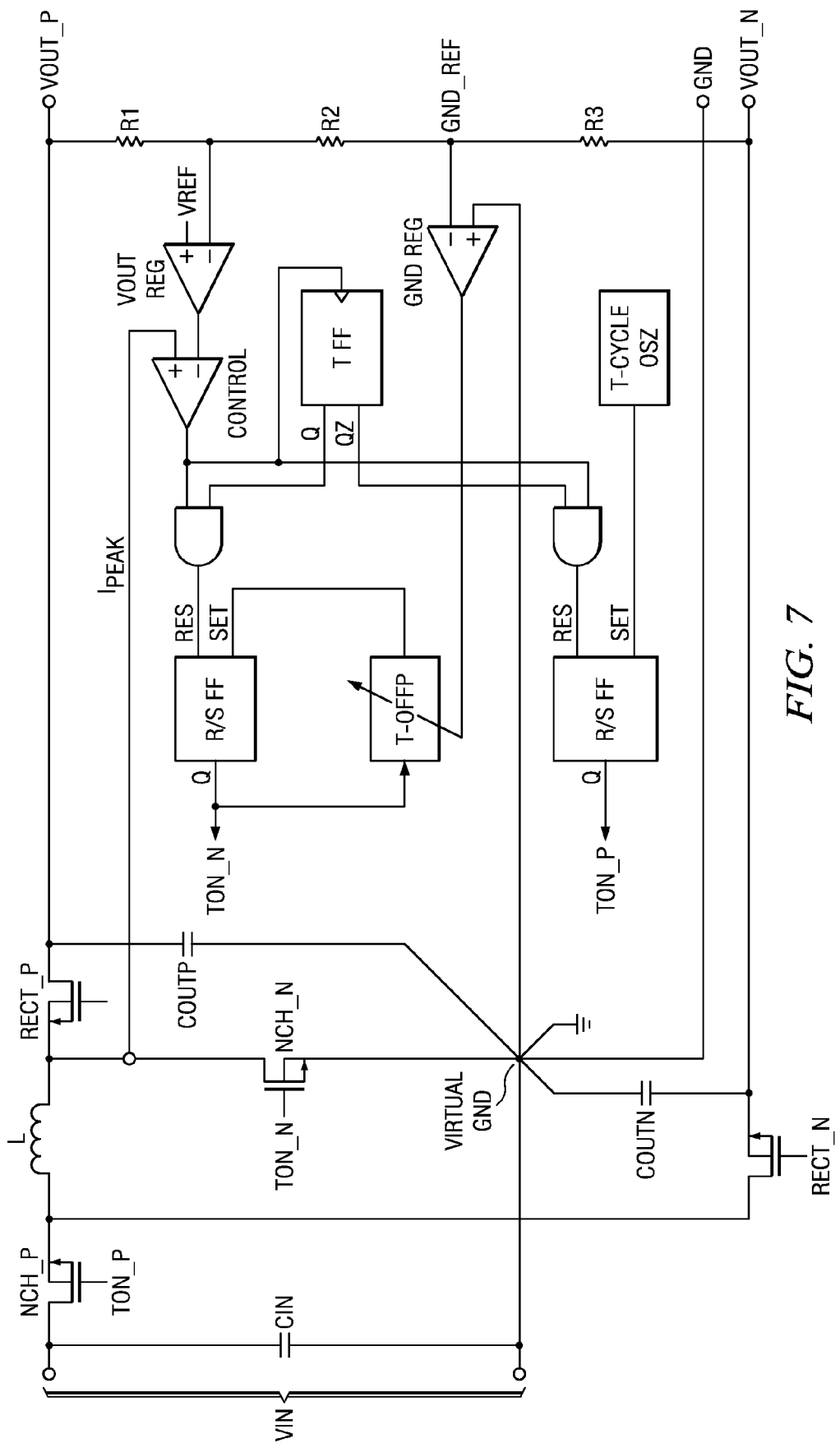
FIG. 7 is a more detailed circuit diagram of another embodiment of the converter.

The inductor current regulation and the voltage regulation are generally similar in the embodiment of FIG. 7; however, the regulation circuitry in FIG. 7 provides separate gate control signals TON_P and TON_N to transistors NCH_P and NCH_N, thereby implementing the inductor current control concept illustrated in FIG. 8. It is seen that the inductor current $I_L$ has alternating periods. Every first period consists of times TON(A) and TOFFP, and every second period consists of times TON(B) and TOFFN. In both TON(A) and TON(B), both transistors are turned ON. However, during time TOFFP, NCH_P is ON and NCH_N is OFF, whereas in TOFFN, NCH_P is OFF and NCH_N is ON. It is only after time TOFFN that the inductor current reaches zero.

In this embodiment, the voltage across the inductor during TOFFP is VOUTP-VIN and during TOFFN it is VOUTN. These values are smaller than the voltage across the inductor in the first embodiment, where voltage during TOFF is /VOUTP/+/VOUTN/. Due to the smaller inductor voltages during the off-times in this embodiment, the inductor ripple current is reduced and therefore the efficiency is improved. The PSRR is still good as long as the inductor current can decay to zero after the last off-cycle TOFFN of a single current burst and the bursts are repeated with constant frequency.

Figure 9:
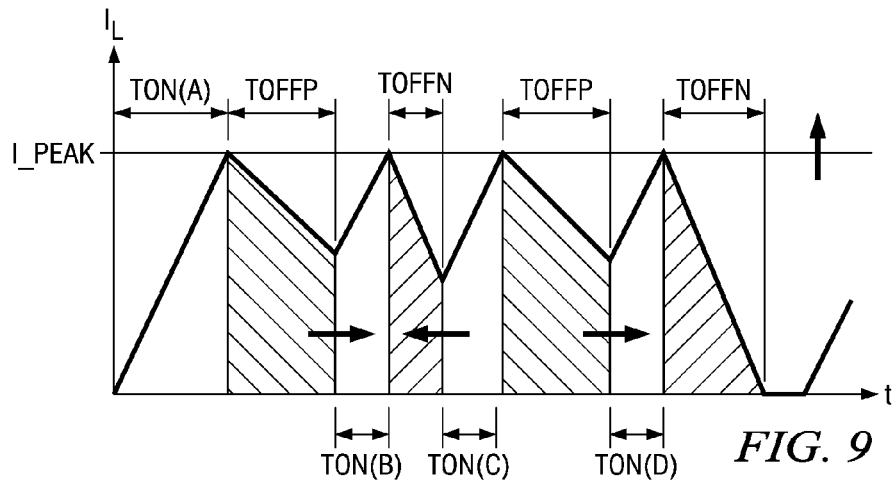
FIG. 9 is a graph illustrating inductor current vs. time for yet another embodiment.

An alternative mode of operation with the same embodiment is illustrated in FIG. 9. The inductor current is organized in successive sequences or bursts and each sequence consists of two ON/OFF cycles for each output voltage VOUT_P and VOUT_N. In the first cycle (or period) of each sequence, the inductor charge current is increased from zero to I_PEAK during TON(A) and during TOFFP the inductor discharge current decreases to an intermediate value. In the second cycle, the charge current rises from the intermediate value to I_PEAK during TON(B) and decreases to another intermediate value during TOFFN. In the third cycle, the charge current rises from the intermediate value to I_PEAK during TON(C) and then decreases again to an intermediate value during TOFFP. In the fourth and last cycle, the charge current rises from the intermediate value to I_PEAK during TON(D) and then is allowed to drop to zero during TOFFN. This mode of operation further reduces the inductor ripple current and thus improves the efficiency of the converter. As long as the discharge current is allowed to drop to zero in the last cycle of each sequence and the sequences are repeated at constant frequency, a high PSRR is ensured.

Those skilled in the art will appreciate that other embodiments and variations are possible within the scope of the claimed invention.

What is claimed is:

1. A DC-DC converter for producing, from a single supply input, first and second output voltages of opposite polarities with respect to a common reference potential, comprising:
   an inductor with a first terminal connectable to a first terminal of the supply input through a first power transistor and a second terminal connectable to a second terminal of the supply input through a second power transistor;
   a first rectifier element connecting the first terminal of the inductor with a first output terminal;
   a second rectifier element connecting the second terminal of the inductor with second output terminal;
   a resistive voltage divider connected between the first and second output terminals; and
   a control circuit connected and adapted for using an input from the voltage divider as a reference input voltage and providing an output current to the second terminal of the supply input in response to a voltage difference between the reference input voltage and the voltage at the second terminal of the supply input; thereby providing a virtual common reference potential at said second terminal of the supply input.

2. The DC-DC converter of claim 1, wherein the control circuit includes a buffer-connected operational amplifier with a non-inverting input connected to a tap of the voltage divider and an output connected to the second terminal of the supply input.

3. The DC-DC converter of claim 1, further comprising a control loop connected and adapted to regulate an inductor charge current ramp in successive periods to reach a constant peak value.

4. The DC-DC converter according to claim 1, wherein the rectifier elements are synchronous rectifiers implemented by power transistors.

5. A DC-DC converter producing, from a single supply input, first and second output voltages of opposite polarities with respect to a common reference potential, comprising:
   an inductor with a first terminal connectable to a first terminal of the supply input through a first power transistor and a second terminal connectable to a second terminal of the supply input through a second power transistor;
   a first rectifier element connecting the first terminal of the inductor with a first output terminal;
   a second rectifier element connecting the second terminal of the inductor with a second output terminal;
   a resistive voltage divider connected between the first and second output terminals; and
   a control circuit connected and adapted for using an input from the voltage divider as a reference input voltage and adjusting an ON-OFF timing of the power transistors so as to maintain symmetry between both outputs with respect to a virtual common reference potential at said second terminal of the supply input.

6. The DC-DC converter of claim 5, wherein said control circuit comprises a comparator that compares the reference input voltage with the virtual common reference potential and, in response, causes said first and second power transistors to be switched so that additional energy is momentarily supplied to only one of said first and second output terminals.

7. The DC-DC converter of claim 6, wherein the comparator output modulates the ON-OFF timing of said first and second power transistors.

8. The DC-DC converter of claim 6, wherein only one of the first and second power transistors is momentarily OFF before both transistors are OFF in the same period of an inductor current.

9. The DC-DC converter of claim 8, wherein the periods of the inductor current are of a fixed duration and the inductor current in each period is allowed to drop to zero.

10. The DC-DC converter of claim 6, wherein only one of the first and second power transistors is OFF in one of two successive periods of the inductor current, and both transistors are OFF in the second of two successive periods of an inductor current.

11. The DC-DC converter of claim 10, wherein alternating periods of the inductor current are of different durations and the inductor current in every second period is allowed to drop to zero.

12. The DC-DC converter of claim 10, wherein each of said first and second output terminals have an associated buffer capacitor connected to the second terminal of the supply input.

13. The DC-DC converter of claim 10, wherein alternating periods of the inductor current are of different durations and the inductor current in every last period only in repeated sequences of periods is allowed to drop to zero.

14. The DC-DC converter according to claim 6, wherein the rectifier elements are synchronous rectifiers implemented by power transistors.

* * * * *